Feb. 23, 1954  C. B. V. NEILSON ET AL  2,670,160
AIRCRAFT LANDING GEAR WITH MEANS FOR MINIMIZING
WHEEL DRAG LOAD INCIDENT TO LANDING
Filed April 17, 1950
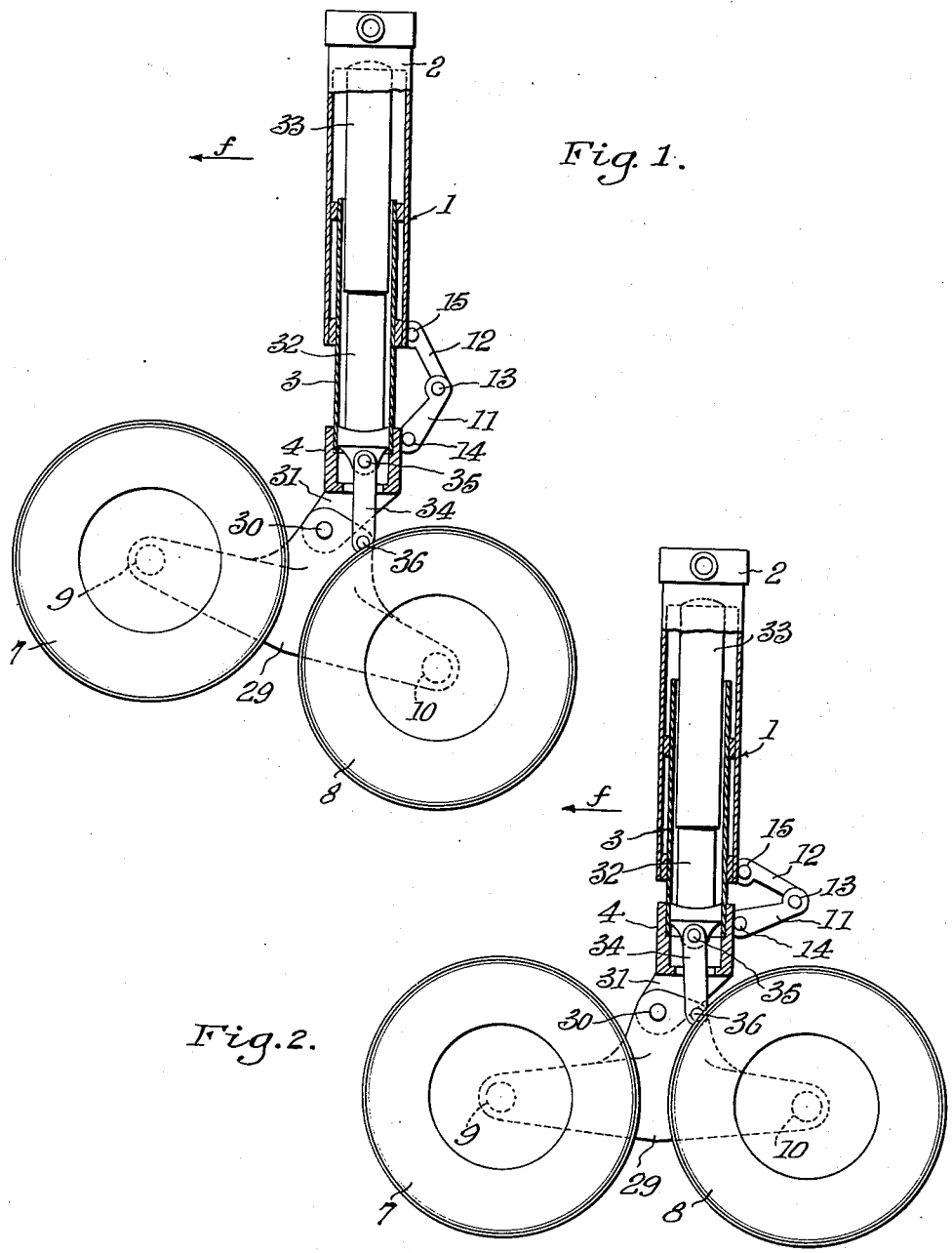
INVENTORS
Christopher Bernard Vere Neilson
Robert George Hoare
BY Baldwin, Wight, & Prevost
their ATTORNEYS Patented Feb. 23, 1954

2,670,160

UNITED STATES PATENT OFFICE 2,670,160

AIRCRAFT LANDING GEAR WITH MEANS FOR MINIMIZING WHEEL DRAG LOAD INCIDENT TO LANDING

Christopher Bernard Vere Neilson, Fearnhead, near Warrington, and Robert George Hoare, Warrington, England, assignors to Electro-Hydraulics Limited, Warrington, England, a company of Great Britain Application April 17, 1950, Serial No. 156,246

Claims priority, application Great Britain July 14, 1949

5 Claims. (Cl. 244—104)

This application is a continuation-in-part of the copending application of Christopher Bernard Vere Neilson and Robert George Hoare, Serial No. 48,466, filed September 9, 1948, now abandoned.

This invention relates to aircraft landing gear, and more particularly to improvements in the construction of such gear by which drag loads incident to landing are minimized.

Modern aircraft, particularly large and heavy airplanes, commonly are equipped with landing gear comprising closely associated sets of wheels grouped in a unit and spaced from each other fore-and-aft, that is in the direction of the line of flight. Customarily the wheels of such a set or unit are mounted on the undercarriage leg or other support in such manner, or at such an angle to the ground during a landing approach, that the leading and trailing wheels of the set, group, or unit of tandem wheels contact the ground simultaneously. Since the wheels normally are not rotating at the time of initial contact with the ground, their static inertia (to rotation) must be overcome to start them rotating, resulting in a serious drag load which is hard on the landing wheel tires, and which produces some tendency for the aircraft to nose over.

Various proposals have heretofore been put forward to overcome these disadvantages, for example by providing the landing wheels or tires with flaps operating by the air flow to "spin up" or start the wheels rotating before landing. Such arrangements, however, are subject to the disadvantage that they increase wind resistance. It also has been proposed to provide special motors for "spinning up" the wheels just before landing; but the penalties of increased weight, cost, and complexity of the contact equipment attending such expedients are apparent.

An object of the present invention is to provide an aircraft landing gear construction in which relatively rotatable tandem wheels of a set of fore-and-aft spaced wheels are normally so biassed that when the aircraft approaches the ground for a landing one of the wheels is lower than its associated tandem wheel, the arrangement being such that the lower wheel contacts the ground first and is started to rotate, after which the biassing means enables the other wheel to move downwardly, relatively to the aircraft, to contact the ground and to be started to rotate. In this way the drag loads resulting from overcoming inertia of the two wheels are imposed in succession, rather than simultaneously; and the maximum instantaneous drag load is greatly reduced. A related advantage of constructions embodying the present invention is that the reduction in maximum drag loads permits most, if not all, parts of the undercarriage to be more lightly constructed.

An important requirement of the present invention is that the tandem wheels of a unit or set be freely relatively rotatable as well as that they be mounted and biassed so as to effect the successive ground contact and "spinning up" referred to above. Accordingly the invention is not adapted for use in landing gear constructions of the endless band type in which not only must the whole band be started to move at one time, but also the wheels mounting the band must simultaneously be started to rotate, thus aggravating the disadvantages due to overcoming the static inertia of a plurality of wheels.

A representative embodiment of the invention is illustrated in the accompanying drawings, in which:

Figure 1 is a somewhat diagrammatic elevation of an aircraft undercarriage support or leg on which mechanism embodying the invention is mounted, the parts being shown in the positions occupied before the wheels are loaded; and Figure 2 is a view similar to Figure 1 but showing the parts in the positions occupied when the wheels are loaded.

In each of the figures, the line of flight may, for convenience, be considered as being indicated by the arrow $f$.

The construction shown in Figure 1 includes an undercarriage support or leg, generally designated 1, adapted to be connected at its upper end to an aircraft in any suitable manner. The support 1 is shown as including a cylinder element 2 and a piston element or sliding tube 3.

Mounted on the lower end of the piston element 3 is a fitting 4 fast to which is an arm 31 offset from the center line of the leg 1 forwardly in the direction of the line of flight. Pivoted at 30 on the arm 31 is a bogie or truck frame 29 which is adapted to tilt about the pivot 30. Landing wheels 7 and 8 arranged substantially in tandem or fore-and-aft disposition are journalled, respectively, at 9 and 10 on the leading and trailing ends of the bogie 29. Any suitable means may be provided for holding the bogie and the wheels aligned in the direction of the line of flight. In the form shown, the aligning means includes a pair of toggle links 11 and 12 pivoted together at 13, and pivoted respectively at 14 and 15 to the fitting 4 and to the cylinder element 2.

In accordance with the invention, the bogie 29 is so biassed that, when the support 1 is in the position it normally occupies when the aircraft is approaching a landing, one of the landing wheels will be disposed lower than the other. In the construction shown in Figure 1, the bogie 29 is so biassed that the trailing wheel 8 is disposed lower than the leading wheel 7. The cushioning or biassing device for normally holding the bogie 29 tilted so as to dispose the trailing wheel 8 lower than the leading wheel 7 may be a shock absorber device functioning dually as the shock-absorber for the landing-wheels and as means for biassing the rear wheel or rear wheels of the bogie downwardly when air-borne or on landing. In this case, the shock absorber is fixed against vertical movement in the telescopic leg on its upper end only, whereas the lower end of the shock absorber is free to slide in the telescopic leg. The telescopic leg consists of the outer cylinder 2 and the inner cylinder or sliding tube 3. The shock absorber consists of the outer cylinder 33 and the inner concentric cylinder or piston 32 providing a cushioning member. The shock absorber may be of the general class exemplified by the shock absorber shown in the patent to Krammer No. 1,653,361, dated December 20, 1927. A link 34 is pivoted as at 35 to the shock absorber piston 32, and as at 36 to the bogie 29 at a point spaced rearwardly of the pivot 30.

In operation, when the aircraft approaches the ground for a landing, the parts will be in the positions shown in Figure 1, it being understood that the ground line will be substantially normal to the center line of the leg 1. Because of the lower disposition of the trailing wheel 8, this wheel will contact the ground and will be "spun up" or will be started to rotate before the leading wheel 7 contacts the ground. The piston 32 will yield upwardly when the vertical load is imposed on the trailing wheel 8 so as to permit the bogie 29 to tilt and bring the leading wheel 7 into contact with the ground as shown in Figure 2. Thus wheels 8 and 7 are "spun up" in succession. The first part of the closure of the main shock absorber will be accomplished without closure of the telescopic cylinders 2 and 3, while the second and larger part of the closure of the shock absorber will be accomplished by a corresponding closure of cylinders 2 and 3.

The construction disclosed embodies the invention in a preferred form, but it is intended that the disclosure be illustrative rather than definitive of the invention, and may be particularly adapted to bogies carrying more than two wheels in tandem, or more than one pair of wheels in tandem, for example, two pairs of wheels in tandem, one on each side of the frame 29, the invention being defined in the claims.

We claim:

1. In aircraft landing gear construction, an undercarriage support; a bogie; two landing wheels journalled on said bogie for independent relative rotation and spaced fore-and-aft of each other so that one is leading and one is trailing with respect to the line of flight; means mounting said bogie on said support for tilting about an axis transverse to the line of flight; and yieldable means biassing said bogie to a position in which one of said wheels is lower than the other of said wheels when said support is at the normal landing approach angle to the ground, whereby said lower wheel will be rotated by contact with the ground before the other of said wheels contacts the ground, said mounting means comprising a vertically movable piston element and a pivotal connection between said bogie and said element, said biassing means comprising a cushioning member mounted for vertical movement, a link, a pivotal connection between one end of said link and said cushioning member and a pivotal connection between the other end of said link and said bogie, said piston element and said cushioning member being constituted of reciprocable concentric pistons, one within the other.

2. In aircraft landing gear construction, an undercarriage support, a bogie, two landing wheels journalled on said bogie for independent relative rotation and spaced fore-and-aft of each other so that one is leading and one is trailing with respect to the line of flight, said support including a shock absorber disposed longitudinally of and within the support, said shock absorber having a piston, means mounting said bogie on said piston for tilting about an axis transverse to the line of flight, said shock absorber biassing said bogie to a position in which one of said wheels is lower than the other of said wheels when said support is at the normal landing approach angle to the ground, whereby said lower wheel will be rotated by contact with the ground before the other of said wheels contacts the ground, said shock absorber being of a capacity to delay contact of said other wheel with the ground until the said lower wheel rotates by contact with the ground.

3. In aircraft landing gear construction, an undercarriage leg having a cylinder and a tube slidable therein, a shock absorber having a cylinder fixed within the first cylinder, a piston within said tube slidable in the second-mentioned cylinder and coacting therewith to form a shock absorber, a bogie, two landing wheels journalled on said bogie for independent relative rotation and spaced fore-and-aft of each other so that one is leading and one is trailing with respect to the line of flight, means mounting said bogie on said tube for tilting about an axis transverse to the line of flight, linkage through the lower end of said tube connecting said piston and said bogie, said shock absorber biassing said bogie to a position in which one of said wheels is lower than the other of said wheels when said leg is at the normal landing approach angle to the ground, whereby said lower wheel will be rotated by contact with the ground before the other of said wheels contacts the ground, said shock absorber being of a capacity to delay contact of said other wheel with the ground until the said lower wheel rotates by contact with the ground.

4. In aircraft landing gear, a leg having a cylinder, a tube member slidable therein, a bogie, two landing wheels journalled on said bogie for independent relative rotation and spaced fore-and-aft of each other so that one is leading and one is trailing with respect to the line of flight, a shock absorber including a cylinder fixed in the first cylinder and a piston member within the tube slidable within the second-mentioned cylinder, linkage connecting said bogie to one of said members whereby the shock absorber biasses said bogie to a position in which one of said wheels is lower than the other of said wheels when said leg is at the normal landing approach angle to the ground, whereby said lower wheel will be rotated by contact with the ground before the other of said wheels contacts the ground, said shock absorber being of a capacity to delay contact of said other wheel with the ground until the said lower wheel rotates by contact with the ground.

5. In aircraft landing gear construction, an undercarriage support comprising a cylinder; a bogie; two landing wheels journalled on said bogie for independent relative rotation and spaced fore-and-aft of each other so that one is leading and one is trailing with respect to the line of flight; a piston element reciprocable in said cylinder and mounting said bogie on said support for tilting about an axis transverse to the line of flight; and yieldable means biassing said bogie to a position in which one of said wheels is lower than the other of said wheels when said support is at the normal landing approach angle to the ground, whereby said lower wheel will be rotated by contact with the ground before the other of said wheels contacts the ground, said biassing means comprising a shock absorber also having relatively longitudinally movable piston and cylinder elements, the said two piston elements being in concentric nested relation.

CHRISTOPHER BERNARD
VERE NEILSON.
ROBERT GEORGE HOARE.

References Cited in the file of this patent

UNITED STATES PATENTS

| Number | Name | Date |
|---|---|---|
| 1,379,576 | Killen | May 24, 1921 |
| 1,653,361 | Krammer | Dec. 20, 1927 |
| 1,802,692 | Zindel | Apr. 28, 1931 |
| 2,433,830 | Dowty | Jan. 6, 1948 |
| 2,490,485 | Spaeth | Dec. 6, 1949 |

FOREIGN PATENTS

| Number | Country | Date |
|---|---|---|
| 123,174 | Great Britain | Feb. 18, 1919 |
| 537,541 | Great Britain | June 26, 1941 |